ns
3,338,880
DISAZO DYESTUFFS
Francois Favre, Basel, Werner Bossard, Riehen, and Jacques Voltz and Hans E. Wegmuller, Basel, Switzerland, assignors to J. R. Geigy, A.-G., Basel, Switzerland
No Drawing. Filed Aug. 7, 1963, Ser. No. 300,639
Claims priority, application Switzerland, Aug. 16, 1962, 9,817/62; Jan. 16, 1963, 505/63
9 Claims. (Cl. 260—156)

This invention relates to a new class of dyes which are specifically suited for the dyeing of polyester and particularly of polyethylene glycol terephthalate fibers and to the dyeings on said fibers which are distinguished by outstanding fastness to sublimation and light.

The dyeing of polyethylene glycol terephthalate fibers among which there are such well-known fibers as Dacron, Terylene, Tergal, Diolen, Trevira and Kodel, presents special problems due to the fact that dyed fabrics made from these fibers are usually subjected to a process by which they are permanently pleated. Permanent pleats are applied to dyed fabrics of these fibers by pressing the fabric between two steel plates with simultaneous heating to about 180° C. for a brief period. It is, therefore, necessary that the dyeings subjected to this treatment are fast to sublimation at the aforementioned elevated temperature range, otherwise, the pleated edge will be seriously discolored.

Dyeings of the said fibers in red shades have hitherto often lacked the necessary fastness to sublimation and, frequently, also failed in fastness to light.

It is, therefore, an object of our invention to provide dyestuffs which dye polyethylene glycol terephthalate fibers in red and scarlet shades with good to outstanding fastness to light and to sublimation.

We have found that, surprisingly, this object and others which will become apparent in the description of the invention given hereinafter, are attained by the novel disazo dyestuffs according to the invention, which are difficultly soluble in water and which are of the formulas

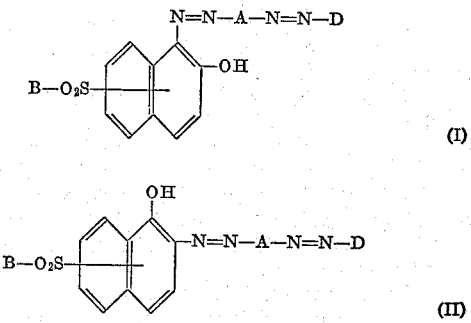

wherein A is a phenylene radical which is preferably unsubstituted, or which is substituted by lower alkyl or lower alkoxy groups, or by halogen, in particular chlorine or bromine, D is a phenyl radical which is unsubstituted or substituted with alkyl of 1 to preferably not more than 5 carbon atoms, hydroxyl, lower alkoxy, phenoxy, nitro, fluorine, chlorine, bromine or lower alkyl-sulfonyl, B is one of the following radicals:
(a) The amino group,
(b) A substituted amino group having 1 or 2 N-substituents which are, independently of each other, alkyl with from 1 to preferably not more than 10 carbon atoms, hydroxy-lower alkyl groups, lower alkoxy-lower alkyl, lower alkanoyloxy-lower alkyl, cyano-lower alkyl, or a substituted amino group wherein one of the two bonds of the amino nitrogen is occupied by hydrogen or one of the aforesaid substituents, while the other bond is occupied by benzoyloxy-lower alkyl, cycloalkyl with six ring carbon atoms, preferably cyclohexyl, benzyl, phenyl, lower alkyl-phenyl, lower alkoxy-phenyl, chloro-phenyl or bromo-phenyl;

Hydroxy-lower alkyl and lower alkoxy-lower alkyl being preferred N-substituents of the amino group because of their favorable influence on the drawing power of the dyestuffs according to the invention;

(c) An alkoxy group having at least 4 and preferably not more than 8 carbon atoms;
(d) A phenyl-lower alkoxy group wherein the phenyl moiety is either unsubstituted or substituted by lower alkyl, chlorine or bromine and wherein the lower alkoxy moiety has preferably from 1 to 2 carbon atoms;
(e) Cycloalkoxy with 6 ring carbon atoms, preferably cyclohexoxy;
(f) Unsubstituted phenoxy or phenoxy substituted by lower alkyl, phenyl, lower alkoxy, hydroxy-lower alkoxy, phenoxy, lower alkoxy-carbonyl, carbamyl, sulfamyl, carbamyl N-mono- or N,N-di-substituted with lower alkyl, hydroxy-lower alkyl or lower alkoxy-lower alkyl, sulfamyl N-mono- or N,N-di-substituted with lower alkyl, hydroxy-lower alkyl or lower alkoxy-lower alkyl, N,N-di-lower alkyl-amino, lower alkanoyl-amino, chlorine or bromine;
(g) pyridyl-3-oxy; or
(h) morpholinyl-(1) or piperidinyl-(1).

The dyestuffs of Formulas I and II must not contain any water-solubilizing groups which dissociate acid in water.

Particularly easily accessible, pure disazo dyestuffs which have excellent fastness to light are those of Formula I having the —SO$_2$B group in the 6- or 7-position and those of Formula II having the —SO$_2$B group in 4- and 5-position, respectively, of the naphthalene nucleus. In addition, these dyestuffs have very pure shades and they produce dyeings which are fast to light and sublimation.

Disazo dyestuffs of Formulas I and II wherein B represents a ring-substituted aryloxy group of the benzene series as defined above are preferred on account of their high drawing power.

Similarly good drawing power is possessed by disazo dyestuffs of Formula II in which B is a mono- or bis-hydroxyalkylamino group.

Dyestuffs in which A is the unsubstituted 1,4-phenylene radical and D is the unsubstituted phenyl radical are preferred because of their good drawing power and the excellent sublimation and light fast dyeing attained therewith.

Dyes according to the invention with particularly outstanding drawing power on polyethylene glycol terephthalate fibers are those which consist of mixtures of the dyestuffs of Formulas I or II, in which one component is a dyestuff of the aforesaid formulas in which B has the meaning defined above under (a) or, preferably, under (b), while the other component of the mixture is a dyestuff of the Formulas I or II wherein B has either the meaning given above under (b) or the meaning given above under (f) or (g); mixtures of a dyestuff according to the invention wherein B has the meaning of (b) with a dystuff according to the invention wherein B has the meaning of (g), excel because of their outstanding drawing power and the fastness to sublimation and light of the dyeings obtained therewith on polyester fibers. The two components are mixed with each other in a ratio ranging from about 1:4 to 4:1 and preferably in ratio of approximately 1:1.

The term "lower" used in connection with aliphatic radicals means radicals with from 1 to 4 carbon atoms.

The dyestuffs of Formulas I and II are generally not suited for the dyeing of such other fibers as cellulose acetate fibers, polyamide fibers or polyacrylonitrile and the like synthetic fibers on an industrial scale.

Their outstanding specific dyeing properties on polyester fibers distingush them from disazo dyes of similar structure which lack the —SO₂B substituent and possess instead, for instance, substituents which dissociate acid in water such as the —SO₃H group. This also distinguishes them from monoazo dyes of the benzene-azo-naphthalene series which possess an amino group as substituent of the naphthalene nucleus in lieu of the hydroxy group. Replacement of the amino by the hydroxy group has been tried by us in such monoazo dyes but leads to compounds which afford dyeing on polyethylene glycol terephthalate fibers only with inferior fastness to light and sublimation, and are, therefore, unsuited for the dyeing of polyethylene glycol terephthalate fibers for commercial purposes.

The compounds of Formulas I and II according to the invention as well as structurally similar compounds as defined below are produced, respectively, by coupling the diazonium compound of an aminoazo dyestuff of the formula

$$H_2N—A—N=N—D \qquad (III)$$

wherein A and D each represent a radical of the benzene series and more particularly the radicals defined below in relation to Formulas I and II, with a 2-hydroxynaphthalene compound of the formula

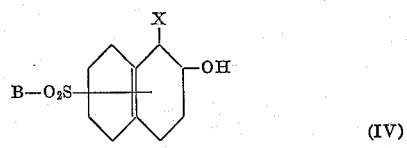

(IV)

or with a 1-hydroxynaphthalene compound, coupling mainly in the 2-position, of formula

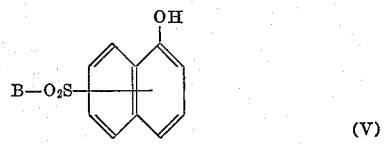

(V)

respectively, in which formulas X represents hydrogen or a substituent which can be replaced by the diazo group, and B represents an unsubstituted or substituted amino group, an alkoxy group containing at least 4 carbon atoms, a cycloalkoxy group, an aralkoxy group or an unsubstituted or ring-substituted aryloxy group, and, more particularly, the groups defined under (a) to (g), supra, in connection with Formula I.

As substituent which can be replaced by the diazo group, X represents, for example, the carboxylic acid group. Advantageously X is hydrogen.

The phenyl radical D can be unsubstituted or substituted as defined, for example, by hydrocarbon groups such as methyl, ethyl, propyl, isopropyl, butyl or amyl groups, by the hydroxy group; ether groups, particularly low alkoxy groups such as the methoxy or ethoxy group, a phenoxy group which is unsubstituted or substituted by lower alkyl groups or by halogen; also acylamino groups, particularly carbacylamino groups such as the acetylamino, propionylamino, chloroacetylamino, β-chloropropionylamino, benzoylamino, chlorobenzoylamino group; further by hydrocarbon-sulfonylamino and halogen-hydrocarbon-sulfonylamino groups such as the methylamino or chloromethylsulfonylamino or benzene sulfonylamino group; or by azinylamino groups, preferably by halogenotriazinylamino or halogenopyrimidylamino groups, in particular a chlorotriazinylamino or chloropyrmidylamino group such as the 2,4,6-trichlorotriazinylamino or 2,4,5,6-tetrachloropyrimidylamino groups; by the nitro, trifluoromethyl or cyano group; by halogen atoms, particularly fluorine, chlorine or bromine; by acyl groups, preferably carbacyl groups such as the acetyl or benzoyl group; carboxylic acid ester groups such as the carbomethoxy, carboethoxy, carbopropoxy, carboisopropoxy, carbobutoxy, carbocyclohexyloxy, carbobenzyloxy or carbophenyloxy groups; carboxylic acid amide groups such as carboxylic acid-amide, -N-methylaminde, -N-ethylamide, -N,N-dimethylamide, -N,N-diethylamide, -N,N-dihydroxyethylamide, - N - methyl-N-hydroxyethylamide, -N,N-dibutylamide, -N-cyclohexylamide, -N-methyl-N-phenylamide, -N-phenyl-N-ethylamide, -piperidide or -morpholide radicals; by low alkylsulfonyl groups such as methylsulfonyl or ethylsulfonyl groups; by sulfonic acid amide groups such as sulfonic acid amide, sulfonic acid-N-methylamide, -N-ethylamide, -N,N-dimethylamide, -N,N-diethylamide, -N,N-dibutylamine, -N,N-dihydroxyethylamide, -N-methyl-N-hydroxyethylamide, -N-methyl-N-phenylamide, -N-ethyl-N-phenylamide, -piperidide or morpholide groups; by sulfonic acid ester groups such as sulfonic acid butyl ester, sulfonic acid benzyl ester, sulfonic acid cyclohexyl ester groups; sulfonic acid aryl ester groups such as sulfonic acid phenyl ester, sulfonic acid-1'-, -3'- or -4'-methylphenyl ester, sulfonic acid-2'-, -3'- or -4'-chlorophenyl ester, sulfonic acid-2'-, -3'- or -4'-bromophenyl ester, sulfonic acid-2'-hydroxymethylphenyl ester or sulfonic acid-2'-, -3'- or -4'-methoxyphenyl ester groups.

The phenylene radical A is preferably unsubstituted or it can be substituted as defined, for example, by lower alkyl groups such as methyl or ethyl, by lower alkoxy such as the ethoxy or methoxy group, by acylamino groups such as the acetylamino or propionylamino group and/or halogens such as chlorine or bromine.

B is derived from ammonia or from a primary or secondary organic amine: in the latter case, the N-substituents can be identical or different. It can also be derived from heterocyclic amines such as morpholine or piperidine.

When B is a substituted amino group, the following are examples of mono-nitrogen or, independently of each other, di-nitrogen substituents:

Alkyl groups such as methyl, ethyl, n-propyl, isopropyl, normal, secondary or tertiary butyl, an amyl, octyl or decyl group, substituted alkyl groups such as β-hydroxyethyl, β-acetoxyethyl, γ-hydroxypropyl, γ-acetoxypropyl, cyanoethyl, β-methoxyethyl, β-ethoxyethyl, γ-methoxypropyl, γ-ethoxypropyl, γ-phenoylpropyl groups such as benzyl, or cycloalkyl groups such as the cyclohexyl group, or aryl group such as phenyl, alkylphenyl, alkoxyphenyl, halogenphenyl groups.

Particularly, the γ-methoxy-propyl and the β-hydroxyethyl group are preferred N-substituents of the group —SO₂—B because of their favorable effect on the drawing power of the dyestuffs according to the invention. Thus, B in this case is derived from ammonia or from a primary or secondary organic amine and in the latter case the N-substituents can be identical or different and also bound to form heterocycles.

In the cases where B is an alkoxy group having 4 carbon atoms, a cycloalkoxy or aralkoxy group, then it is derived, for example, from n-, sec.-, iso- or tert.-butanol or from an amyl, hexyl or octyl alcohol.

When B is an aralkoxy or cycloalkoxy group it is derived e.g. from benzyl alcohol, a benzyl alcohol substituted by low alkyl groups such as methyl or ethyl groups or by halogens such as chlorine or bromine, or from cyclohexanol.

When B is a ring-substituted aryloxy group, then it is preferably derived from a hydroxybenzene such as phenol or phenol substituted by alkyl, aryl alkoxy, hydroxyalkyl, aryloxy, carboxylic acid ester, carbamyl, sulfamyl, N-mono- or N,N-di-substituted carbamyl, or N-mono- or N,N-di substituted sulfamyl groups, tert. amino, acylamino groups, from halogen phenol or from a hydroxynaphthalene; that is, for example, from 2-, 3- or 4-methyl- or 2-, 3- or 4-ethyl-1-hydroxybenzene or technical mixtures thereof, from 2-hydroxy-methyl-4-hydroxybenzene, from 2,4- or 3,4-dimethyl-1-hydroxy-benzene, 4-tert. butyl-1-hydroxybenzene or 4-isooctyl-1-hydroxy-benzene, from 2-, 3- or 4-chloro-1-hydroxy-benzene, from 2,4-, 3,4- or 2,5-dichloro-, 2-, 3- or 4-bromo-, 2-, 3- or 4-methoxy- or 2-, 3- or 4-ethoxy-1-hydroxybenzene, also from 2 or 4-phenyl-, 2-, 3- or 4-dimethylamino- or 2-, 3- or 4-diethylamino- or 2-, 3- or 4-diethylamino- 1-hydroxybenzene, from 2-, 3- or 4-carbomethoxy, 2-, 3- or 4-carboethoxy- or 2-, 3- or 4-carbobutoxy-1-hydroxybenzene, from 2-, 3- or 4-acetylamino-, 2-, 3- or 4-propionylamino-, 3- or 4-carbamyl- or 3- or 4-sulfamyl-1-hydroxybenzene, from 2-, 3- or 4-methyl-, or 2-, 3-, or 4-N,N-dimethyl-carbamyl-, or 2-, 3- or 4-N-methyl- or 2-, 3-, or 4-N,N-dimethylsulfamyl-1-hydroxybenzene, from 4-hydroxydiphenyl ether or from 1- or 2-hydroxynaphthalene.

Diazo components of Formula III usable according to the invention are mainly of the 4-aminoazobenzene series but are also of the 3-aminoazobenzene series. In both cases, the benzene nuclei can be substituted as defined, e.g. by the substituents mentioned in the definitions of A and D.

Suitable diazo components are, for example, the diazonium compounds of 4-aminoazobenzene, 3-methyl- or 3-ethyl-4-aminoazobenzene, 4'-hydroxy-3- or -4-aminoazobenzene, 4'-methoxy- or 4'-ethoxy-3- or 4-aminoazobenzene, 2'-, 3'- or 4'-chloro-4-aminoazobenzene, 2'- 3'- or 4'-nitro-4-aminoazobenzene, 2', 5'- or 3', 4'-dichloro-4-aminoazobenzene, 2',6'-dichloro-4'-nitro-4-aminoazobenzene, 4'-methylsulfonyl- or 4'-ethylsulfonyl-4-aminoazobenzene, 2'-nitro-4'-methylsulfonyl-4-aminoazobenzene, 4-aminoazobenzene - 4'-methylsulfonyl-4-aminoazobenzene, 4-aminoazobenzene-4'-sulfonic acid amide, 4-aminoazobenzene-4'-sulfonic acid-N,N-diethylamide, 4-aminoazobenzene-4'-sulfonic acid-N,N-di-β-hydroxyethylamide, 4-amino-2'-nitro-azobenzene-4'-sulfonic acid - N,N'-diethylamide or 4-amino-2'-nitro-azobenzene-4'-sulfonic acid-N-phenylamide. The preferred diazo component is 4-aminoazobenzene.

2-hydroxynaphthalene sulfonic acid amides and esters of Formula IV to be coupled therewith are derived, e.g. from 2-hydroxynaphthalene-4-, -5-, -6-, -7-, or -8-sulfonic acid of 2-hydroxynaphthalene-1-carboxylic acid-6-sulfonic acid, in particular from 2-hydroxynaphthalene-6- and -7-sulfonic acid.

The 1-hydroxynaphthalene sulfonic acid amides and esters of Formula V which couple in the 2-position and which are to be reacted with these diazonium compounds are derived, for example, from 1-hydroxynaphthalene-3- or -4- or -5-sulfonic acid, in particular from 1-hydroxynaphthalene-4-sulfonic acid.

The amides are obtained, for example, by reacting suitable 2-acyloxynaphthalene sulfonic acids, in particular 2-p-toluene-sulfonyloxy-naphthalene sulfonic acids in the former case, and suitable 1-acyloxynaphthalene sulfonic acids, in particular the 1-p-toluene sulfonyloxynaphthalene sulfonic acids in the latter case, with phosphorus oxychloride to form the corresponding sulfonic acid chlorides, condensation thereof with the desired amine to form the corresponding amide and saponification of the acyloxy group.

The esters are produced, for example, by converting the 2-benzyloxynaphthalenesulfonic acids, in the former case, and the 1-benzyloxynaphthalene sulfonic acids, in the latter case, to their acid halide, condensation of the latter with the desired hydroxyl compound and converting the benzyloxy group to the hydroxyl group by hydrogenolysis, e.g. with palladium on charcoal in a suitable organic solvent such as ethanol.

The coupling is performed advantageously in an aqueous-alkaline solution. If desired, a suitable diazonium compound can also be coupled with a mixture of two or more coupling components used according to the invention; or a mixture of suitable diazo compounds can be coupled with a coupling component usable according to the invention or with several thereof at the same time.

A modification of the process for the production of disazo dyestuffs of Formulas I and II according to the invention consists in reacting a compound of the formula

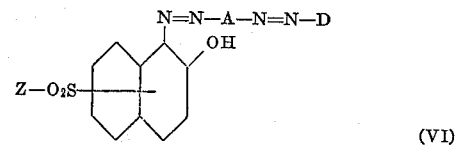

or a compound of the formula

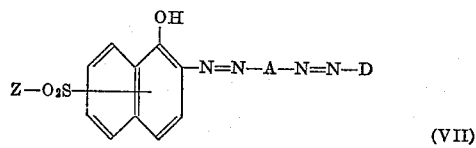

wherein:

Z represents chlorine or bromine, and
A and D are each a radical of the benzene series, with an amine of the formula $$\begin{matrix} R_1 \\ R_2 \end{matrix} \!\!\! \big\rangle \!\! N\!\!-\!\!H$$

(VIII)

wherein:

$R_1$ represents hydrogen, an alkyl, cycloalkyl, aralkyl or aryl group which may be substituted, and
$R_2$ represents hydrogen, an alkyl, cycloalkyl or aralkyl group which may be substituted, and $R_1$ and $R_2$ together with the amino nitrogen atom also represent a heterocycle, or reacting the compound of Formula VI, or VII as the case may be, with an aliphatic hydroxyl compound having at least 4 carbon atoms, or with a cycloaliphatic or araliphatic hydroxyl compound or with an aromatic hydroxyl compound which is unsubstituted or ring substituted, the components being so chosen that the dyestuff contains no water-solubilizing groups which dissociate acid in water.

The remarks regarding A and D in the first process naturally apply in this process too.

The starting materials of Formulas VI and VII are obtained, for example, by reacting the diazonium compound of an amine of Formula III with a 2-hydroxynaphthalene coupling in the 1-position, or with a 1-hydroxynaphthalene sulfonic acid coupling in the 2-position, respectively, and converting the disazo dyestuff sulfonic acid so obtained to the corresponding sulfonic acid chloride or bromide, for example by means of a phosphorus chloride or bromide, optionally in the presence of a tertiary nitrogen base. The diazo components suitable for the first-described process can also be used in the second process; the 2- or 1-hydroxynaphthalene sulfonic acids, respectively, which have been described in the foregoing as coupling components of Formula III, are equally useful as coupling components in this process modification.

The type of nitrogen substitutents of amines of Formula VIII and the type of hydroxy compounds to be reacted with disazo dyestuff sulfonic acid chlorides or bromides have been described in the foregoing definitions of substituent moiety B.

The condensation of the sulfonic acid halides of Formulas VI and VII, respectively, with amines or hydroxyl compounds to form the amides or esters of Formulas I or II, as the case may be, is performed in aqueous, organic or in aqueous/organic solution, where necessary at a raised temperature. Suitable organic solvents for this purpose are those which are miscible with water e.g. lower aliphatic ketones such as acetone or methylethyl ketone, or ether alcohols such as ethylene glycol monomethyl or monoethyl ether, or those which are not miscible with water, for example, unsubstituted or halogenated aromatic hydrocarbons such as benzene, toluene, xylenes, chlorobenzene or dichlorobenzenes.

The hydroxyl compounds are reacted advantageously in the form of their salts such as the sodium or potassium salts. The reaction of the amines is advantageously performed in the presence of an acid binding agent: preferably, the amine to be reacted is used in an amount sufficient to ensure binding all released acid, or the reaction is performed in the presence of an alkali metal salt of carbonic acid or of lower fatty acids such as sodium carbonate or sodium acetate or in the presence of a tertiary base such as pyridine.

The dyestuffs according to the invention are brought into a finely distributed form by milling with dispersing agents. Suitable dispersing agents are, e.g. anionic dispersing agents such as alkylaryl sulfonates, condensation products of formaldehyde and naphthalene sulfonic acids, lignin sulfonates, or non-anionic dispersing agents such as fatty alcohol polyglycol ethers. Advantageously mixtures of anionic and non-anionic dispersing agents are used.

The dyestuffs according to the invention are suitable specifically for the dyeing of high molecular esters of aromatic polycarboxylic acids with polyhydric alcohols, e.g. polyethylene glycol terephthalates, such as Terylene, Dacron, Tergal, Diolen or Trevira, as well as other polymers such as Kodel.

Polyester fibers are dyed with aqueous dispersions of the dyestuffs according to the invention preferably at temperatures above 100° C. under pressure. Very good dyeings are also obtained by impregnating polyester fibers with concentrated, aqueous dispersions of the dyestuffs according to the invention, squeezing out the fabric, drying the same, and then fixing the dyeing at temperatures of 180–250° C. The dyeing can also be performed at the boiling point of the dyebath in the presence of carriers such as phenylphenol, polychlorobenzene compounds or similar auxiliaries.

Depending on their composition and mixture, the dyestuffs according to the invention are distinguished by their good drawing power onto polyester fibers, in particular polyglycol terephthalate fibers. They produce, on these fibers, pure red scarlet, ruby red to red-violet dyeings which have very good fastness to washing, rubbing, steam pleating, sublimation and light. In addition, animal and vegetable fibers, particularly cotton, are very well reserved.

The following non-limitative examples illustrate the invention. Where not otherwise expressly stated, parts and percentages are given therein by weight. The temperatures are in degrees centigrade. The relationship of parts by weight to parts by volume is as that of grams to cubic centimeters.

*Example 1*

A suspension of 19.7 parts of 4-aminoazobenzene in 125 parts of water and 25 parts of concentrated hydrochloric acid is diazotised in the usual manner within 2 hours at 12° with 6.9 parts of sodium nitrite in 120 parts of water.

The clarified diazonium salt solution is poured into a solution of 28.1 parts of 2-hydroxynaphthalene-6-sulfonic acid-N-methyl-N-hydroxyethylamide in 600 parts of water and 8 parts of sodium hydroxide. Sodium hydroxide is added to the reaction mass while cooling to bring its pH to 10–10.5. When the coupling is completed, the red dyestuff is removed by suction, washed with water and dried in vacuo at 60°. The coupling product is a red powder, the composition of which corresponds to the formula

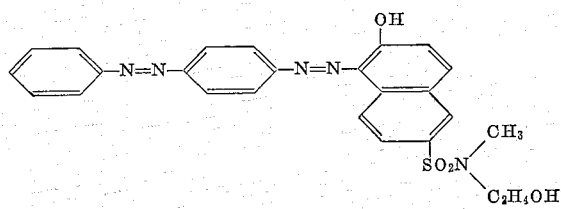

When milled with an alkali salt of dodecylbenzene sulfonate the dyestuff so obtained dyes polyethyleneglycol terephthalate fibers such as Dacron from an aqueous dispersion, preferably in the presence of a carrier such as o-phenylphenol, in scarlet shades. The dyebath is considerably exhausted. The dyeings have very good fastness to light and sublimation.

By using the hydroxynaphthalene sulfonic acid amides, given in Table I below, in the above example instead of the 28.1 parts of 2-hydroxynaphthalene-6-sulfonic acid-N-methyl-N-β-hydroxyethylamide and coupling them with the diazonium salt of 4-aminoazobenzene under the condition described in the above example, dyestuffs are obtained which produce on polyester fibers dyeings with equally good properties.

TABLE I

| Ex. No. | Parts | Amides |
|---|---|---|
| 2 | 22.3 | 2-hydroxynaphthalene-6-sulfonic acid amide. |
| 3 | 23.7 | 2-hydroxynaphthalene-6-sulfonic acid methylamide. |
| 4 | 25.1 | 2-hydroxynaphthalene-6-sulfonic acid dimethylamide. |
| 5 | 26.7 | 2-hydroxynaphthalene-6-sulfonic acid-β-hydroxyethylamide. |
| 6 | 31.1 | 2-hydroxynaphthalene-6-sulfonic acid-di-β-hydroxyethylamide. |
| 7 | 26.5 | 2-hydroxynaphthalene-6-sulfonic acid isopropylamide. |
| 8 | 29.5 | 2-hydroxynaphthalene-6-sulfonic acid-γ-methoxypropylamide. |
| 9 | 27.9 | 2-hydroxynaphthalene-6-sulfonic acid-n-butylamide. |
| 10 | 31.3 | 2-hydroxynaphthalene-6-sulfonic acid-N-methyl-N-phenylamide. |
| 11 | 31.1 | 1-hydroxynaphthalene-4-sulfonic acid-N-di-β-hydroxyethylamide. |

In the latter case, the coupling product is a red powder the composition of which corresponds to the formula

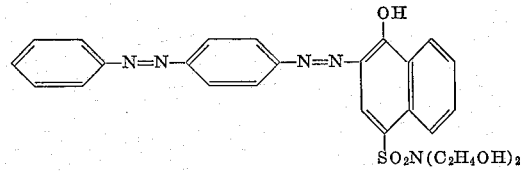

By using, in the above Example 11, instead of the 31.1 parts of 1-hydroxynaphthalene-4-sulfonic acid-N-di-β-hydoxyethylamide, the 1-hydroxynaphthalene-4-sulfonic acid amides given in Table II and coupling the same under the conditions given in the above Example 1 with the diazonium salt of 4-aminoazobenzene, then dyestuffs are obtained which produce dyeings on polyester fibers having equally good properties.

TABLE II

| Ex. No. | Parts | Amides |
|---|---|---|
| 12 | 22.3 | 1-hydroxynaphthalene-4-sulfonic acid amide. |
| 13 | 23.7 | 1-hydroxynaphthalene-4-sulfonic acid methylamide. |
| 14 | 25.1 | 1-hydroxynaphthalene-4-sulfonic acid dimethylamide. |
| 15 | 26.7 | 1-hydroxynaphthalene-4-sulfonic acid-β-hydroxyethylamide. |
| 16 | 28.1 | 1-hydroxynaphthalene-4-sulfonic acid-N-methyl-N-β-hydroxyethylamide. |
| 17 | 26.5 | 1-hydroxynaphthalene-4-sulfonic acid isopropylamide. |
| 18 | 29.5 | 1-hydroxynaphthalene-4-sulfonic acid-γ-methoxypropylamide. |
| 19 | 27.9 | 1-hydroxynaphthalene-4-sulfonic acid-n-butylamide. |
| 20 | 31.3 | 1-hydroxynaphthalene-4-sulfonic acid-N-methyl-N-phenylamide. |

The 1- and 2-hydroxynaphthalene-4-sulfonic acid amides used for the coupling are obtained, for example, by reacting 1-o- or 2-o-tosyloxynaphthalene-4-sulfonic acid with phosphorus oxychloride to form the corresponding sulfonic acid chloride, condensing this with the desired primary or secondary amine or with ammonia to form the corresponding amide and saponifying the o-tosyloxy group with sodium hydroxide.

By using, in the above Example 1, instead of the 19.7 parts of 4-aminoazobenzene, a corresponding amount of the diazo components given in column 2 of the following Table III and coupling these under the conditions given in the above example with the coupling components given in column 3, then dyestuffs are obtained which produce dyeings on polyester fibers having equally good properties.

yl-N-phenylamine, N-hydroxyethyl-N-phenylamine, N-hydroxymethyl-N-phenylamine or cyclohexylamine are employed instead of 17.8 parts of γ-methoxypropylamine.

The 1-(4′-phenylazophenylazo)-2-hydroxynaphthalene-6-sulfonic acid chloride used as starting material is obtained by coupling diazotized 4-aminobenzene with 2-hydroxynaphthalene-6-sulfonic acid and reacting the disazo dyestuff sulfonic acid obtained with phosphorus oxychloride in chlorobenzene in the presence of pyridine.

TABLE III

| Ex. No. | Diazo component | Coupling component | Shade on polyester fibers |
|---|---|---|---|
| 21 | 4-aminoazobenzene | 1-hydroxynaphthalene-3-sulfonic acid dimethylamide | Red. |
| 22 | do | 1-hydroxynaphthalene-3-sulfonic acid-γ-methoxypropylamide. | Red. |
| 23 | do | 1-hydroxynaphthalene-3-sulfonic acid-N-methyl-N-phenylamide. | Red. |
| 24 | 4-amino-4′-ethoxyazobenzene | 1-hydroxynaphthalene-4-sulfonic acid-γ-methoxypropylamide. | Red. |
| 25 | do | Mixture of 1-hydroxynaphthalene-4-sulfonic acid-γ-methoxypropylamide and 1-hydroxynaphthalene-4-sulfonic acid isopropylamide. | Red. |
| 26 | 4-amino-4′-β-hydroxyethoxyazobenzene. | 1-hydroxynaphthalene-4-sulfonic acid dimethylamide | Red. |
| 27 | 4-aminoazobenzene | 2-hydroxynaphthalene-4-sulfonic acid dimethylamide | Red. |
| 28 | do | 2-hydroxynaphthalene-4-sulfonic acid γ-methoxypropylamide. | Red. |
| 29 | do | 2-hydroxynaphthalene-4-sulfonic acid-N-methyl-N-phenylamide. | Red. |
| 30 | do | 2-hydroxynaphthalene-5-sulfonic acid methylamide | Red. |
| 31 | do | 2-hydroxynaphthalene-5-sulfonic acid-β-hydroxyethylamide. | Red. |
| 32 | do | 2-hydroxynaphthalene-8-sulfonic acid methylamide | Yellowish red. |
| 33 | do | 2-hydroxynaphthalene-8-sulfonic acid-β-hydroxyethylamide. | Do. |
| 34 | 4-amino-2′-chloroazobenzene | 2-hydroxynaphthalene-6-sulfonic acid-N-methyl-N-hydroxyethylamide. | Scarlet. |
| 35 | do | 2-hydroxynaphthalene-6-sulfonic acid isopropylamide | Do. |
| 36 | 4-amino-2′,4′-di-chloroazobenzene | 2-hydroxynaphthalene-6-sulfonic acid-n-butylamide | Do. |
| 37 | do | 2-hydroxynaphthalene-6-sulfonic acid dimethylamide | Do. |
| 38 | 4-amino-3′-chloroazobenzene | 2-hydroxynaphthalene-4-sulfonic acid diethylamide | Red. |
| 39 | 4-amino-4′-methoxyazobenzene | 2-hydroxynaphthalene-5-sulfonic acid-β-hydroxyethylamide. | Red. |
| 40 | 4-amino-2′-nitroazobenzene | 2-hydroxynaphthalene-6-sulfonic acid-N-methyl-N-β-hydroxyethylamide. | Scarlet. |
| 41 | 4-amino-3′-nitroazobenzene | do | Do. |
| 42 | 4-amino-2-methylazobenzene | do | Do. |

Example 43

45.05 parts of 1-(4′-phenylazophenylazo)-2-hydroxynaphthalene-6-sulfonic acid chloride are added to 1000 parts of ice water to form a slurry. 17.8 parts of γ-methoxypropylamine are added drop by drop to the sulfonic acid chloride and the temperature is kept at 25° for 4 hours. After this time, the condensation is completed at 60° for a further 2 hours.

After the reaction mixture has been cooled to room temperature, the red dyestuff is filtered off, washed with a large amount of water and dried under vacuum at 60–65°. The product so obtained corresponds to the formula

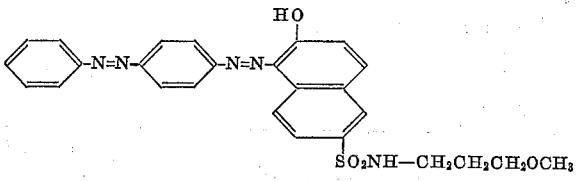

After milling with a condensation product of naphthalene sulfonic acids with formaldehyde, the dyestuff dyes polyethylene glycol terephthalate fibers such as Tergal in scarlet shades in a closed apparatus at 120–125°.

The dyeings are fast to washing, sublimation and light. The dyestuff formed is identical with the dyestuff No. 8 of Table I.

A product having similar properties is obtained with otherwise the same procedure, if equivalent amounts of ammonia, monomethylamine, dimethylamine, β-hydroxyethylamine, N-methyl-N-β-hydroxyethylamine, di-β-hydroxyethylamine, isopropylamine, n-butylamine, N-methyl-N-phenylamine, N-hydroxyethyl-N-phenylamine, N-hydroxymethyl-N-phenylamine or cyclohexylamine are employed instead of 17.8 parts of γ-methoxypropylamine.

The 1-(4′-phenylazophenylazo)-2-hydroxynaphthalene-6-sulfonic acid chloride used as starting material is obtained by coupling diazotized 4-aminobenzene with 2-hydroxynaphthalene-6-sulfonic acid and reacting the disazo dyestuff sulfonic acid obtained with phosphorus oxychloride in chlorobenzene in the presence of pyridine.

Example 44

Example 43 is repeated, but using 45.05 parts of 2-(4′-phenylazophenylazo)-1-hydroxynaphthalene-4-sulfonic acid as the starting material for the reaction with γ-methoxypropylamine, all reaction conditions remaining otherwise the same.

The product so obtained corresponds to the formula

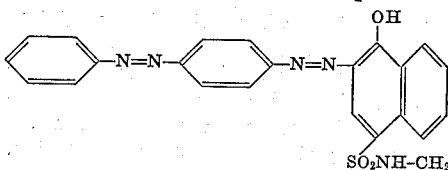

After milling with a condensation product of naphthalene sulfonic acids and formaldehyde, the dyestuff dyes polyethylene glycol terephthalate fibers such as Tergal in red shades in a closed dyeing apparatus at 12–125° C. The dyeings are fast to washing, sublimation and light. The dyestuff formed is identical with the dyestuff No. 18 in Table II.

A product having similar properties is obtained if, instead of the 17.8 parts of γ-methoxypropylamine, equivalent amounts of ammonia, monomethylamine, dimethylamine, β-hydroxyethylamine, N - methyl-N-β-hydroxyethylamine, di - β - hydroxyethylamine, isopropylamine, n-butylamine, N-methyl-N-phenylamine or cyclohexylamine are used in the same procedure.

The 2-(4′-phenylazophenylazo)-1-hydroxynaphthalene-4-sulfonic acid chloride used as starting material is obtained by coupling diazotized 4-aminobenzene with 1-hydroxynaphthalene-4-sulfonic acid and reacting the disazo dyestuff sulfonic acid obtained with phosphorus oxychloride in chlorobenzene in the presence of pyridine.

Example 45

45.05 parts of 2-(4'-phenylazophenylazo)-1-hydroxy-naphthalene-4-sulfonic acid chloride and 11.6 parts of the sodium salt of 1-hydroxybenzene in 600 parts of water and 300 parts of ethyl alcohol are heated for 16 hours at 90–95° while stirring, in the presence of 65 parts of sodium carbonate. After cooling the reaction mixture to room temperature, the precipitated red dyestuff is filtered off, washed with a lot of water and dried in vacuo at 70°. The dyestuff corresponds to the formula

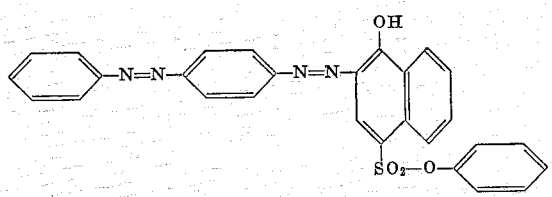

It is milled in the presence of a lignin sulfonate. When dyed from a foulard onto polyethylene glycol terephthalate fibers, such as Trevira, and thermofixed, it dyes these fibers in pure red shades which have excellent fastness to sublimation and light.

By using, in the above example, instead of 1-hydroxybenzene, 2 - methyl-1-hydroxybenzene, 3 - methyl-1-hydroxybenzene, 4-methyl-1-hydroxybenzene, 3-methoxy-1-hydroxybenzene, 4-tert.-butyl-1-hydroxybenzene, 2-chloro-1-hydroxybenzene, a mixture of 2-methyl-1-hydroxybenzene and hydroxybenzene, a mixture of 2- and 4-methyl-1-hydroxybenzene and following the procedure given in the above Example 45, dyestuffs are obtained which produce dyeings on polyester fibers having the same shade and similar properties.

Example 46

A suspension of 19.7 parts of 4-aminoazobenzene in 125 parts of water and 25 parts of hydrochloric acid is diazotised in the usual manner within 2 hours at 12° with 6.9 parts of sodium nitrate in 120 parts of water.

The clarified diazonium salt solution is poured into a solution of 31.1 parts of 2-hydroxynaphthalene-7-sulfonic acid-di-β-hydroxyethylamide in 550 parts of water and 8 parts of sodium-hydroxide. The pH is kept at 10–10.5 by adding sodium hydroxide to the reaction mass.

The resultant red dyestuff is removed by suction, washed neutral and dried in vacuo at 60°. It is in the form of a red powder; its composition corresponds to the formula

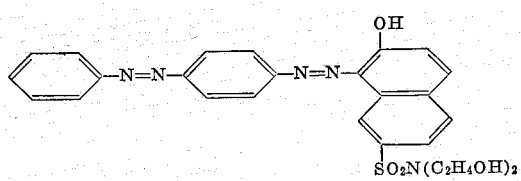

After milling with a condensation product of naphthalene sulfonic acids and formaldehyde, the dyestuff dyes polyethylene glycol terephthalate fibers such as Terylene, preferably in the presence of o-phenylphenol, in pure red shades. The dyeings have very good fastness to washing, light and sublimation.

By using the 2-hydroxynaphthalene sulfonic acid amides given in the following Table IV in the above Example 46 instead of the 31.1 parts of 2-hydroxynaphthalene-7-sulfonic acid-di-β-hydroxyethylamide, and following otherwise the same procedure, then dyestuffs are obtained which produce dyeings having equally good properties on polyester fibers.

TABLE IV

| Ex. No. | Parts | Amides |
|---|---|---|
| 47 | 22.3 | 2-hydroxynaphthalene-7-sulfonic acid amide. |
| 48 | 23.7 | 2-hydroxynaphthalene-7-sulfonic acid monomethylamide. |
| 49 | 27.9 | 2-hydroxynaphthalene-7-sulfonic acid diethylamide. |
| 50 | 26.7 | 2-hydroxynaphthalene-7-sulfonic acid monohydroxyethylamide. |
| 51 | 31.1 | 2-hydroxynaphthalene-7-sulfonic acid methylhydroxyethylamide. |
| 52 | 26.5 | 2-hydroxynaphthalene-7-sulfonic acid isopropylamide. |
| 53 | 29.5 | 2-hydroxynaphthalene-7-sulfonic acid methoxypropylamide. |
| 54 | 27.9 | 2-hydroxynaphthalene-7-sulfonic acid-n-butylamide. |
| 55 | 31.3 | 2-hydroxynaphthalene-7-sulfonic acid methylphenylamide. |
| 56 | 30.7 | 2-hydroxynaphthalene-7-sulfonic acid cyclohexylamide. |
| 57 | 30.8 | 2-hydroxynaphthalene-7-sulfonic acid morpholide. |

By using instead of the 19.7 parts of 4-aminoazobenzene in the above Example 46 the equivalent amounts of diazo components given in column 2 of the following Table V and combining them severally with the indicated one of the coupling components given in column 3 under the conditions described in the example, then dyestuffs are obtained which produce dyeings on polyester fibers which have equally good properties.

TABLE V

| Ex. No. | Diazo component | Coupling component | Shade on polyester fiber |
|---|---|---|---|
| 58 | 4-amino-2'-nitroazobenzene | 2-hydroxynaphthalene-7-sulfonic acid di-β-dihydroxy-ethylamide. | Red. |
| 59 | 4-amino-2'-chloroazobenzene | 2-hydroxynaphthalene-7-sulfonic acid isopropylamide. | Red. |
| 60 | 4-amino-3'-chloroazobenzene | 2-hydroxynaphthalene-7-sulfonic acid-N-methyl-N-phenyl-amide. | Red. |
| 61 | 4-amino-4'-methoxyazobenzene | 2-hydroxynaphthalene-7-sulfonic acid-N-methyl-N-β-hydroxyethylamide. | Red. |
| 62 | 4-amino-3-chloroazobenzene | 2-hydroxynaphthalene-7-sulfonic acid methylamide. | Red. |
| 63 | 4-amino-2-methylazobenzene | 2-hydroxynaphthalene-7-sulfonic acid-γ-methoxypropyl-amide. | Red. |
| 64 | 4-amino-4'-chloroazobenzene | ...do... | Red. |
| 65 | 4-amino-3'-nitroazobenzene | 2-hydroxynaphthalene-7-sulfonic acid-β-hydroxyethyl-amide. | Red. |

Similar dyestuffs with the equally satisfactory properties are obtained by coupling the diazonium salt of 4-aminobenzene with 2-hydroxynaphthalene-7-sulfonic acid, converting the resultant dyestuff into the sulfonic acid chloride as in Example 43 and combining the same with one of the amines given in Example 43.

*Example 66*

A suspension of 22.5 parts of 4-(2'-methyl-phenylazo)-2-methyl-1-aminobenzene in 800 parts of water and 30 parts of 36% hydrochloric acid is diazotised at 10-15° by pouring in a solution of 6.9 parts of sodium nitrite in 50 parts of water. The clear diazonium solution is added dropwise at 0-5° to a solution of 23.7 parts of 1-hydroxynaphthalene-3-sulfonic acid-N-methylamide in 850 parts of water and 8 parts of sodium hydroxide. After a few hours the pH of the reaction mixture is buffered to 10-10.5 by the addition of sodium hydroxide. The precipitated dyestuff of the formula

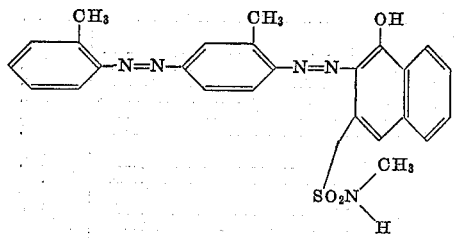

is filtered off, washed with water and dried in vacuo at 60-70°. The dyestuff is a red powder. A preparation produced by milling it with a lignin sulfonate dyes polyethyleneglycol terephthalate fibers, e.g. Diolen, in red shades from an aqueous dispersion, preferably in the presence of a carrier such as o-phenylphenol. The dyeings are fast to rubbing, sublimation and light.

By using in the above example, instead of the 23.7 parts of 2-hydroxynaphthalene-6-sulfonic acid-N-methylamide, a corresponding amount of the coupling components given in column 3 of Table VI and coupling under the conditions given in the Example 66 with the diazonium salt of 4-(2'-methyl-phenylazo)-2-methyl-1-aminobenzene, then dyestuffs are obtained which produce dyeings of equally good properties on polyester fibers.

TABLE VI

| Ex. No. | Parts | Amides |
|---|---|---|
| 67 | 22.3 | 1-hydroxynaphthalene-3-sulfonic acid amide. |
| 68 | 28.1 | 1-hydroxynaphthalene-3-sulfonic acid-methyl-β-hydroxyethyl amide. |
| 69 | 25.1 | 1-hydroxynaphthalene-3-sulfonic acid dimethylamide. |
| 70 | 26.7 | 1-hydroxynaphthalene-3-sulfonic acid-β-hydroxyethylamide. |
| 71 | 31.1 | 1-hydroxynaphthalene-3-sulfonic acid-di-β-hydroxyethylamide. |
| 72 | 26.5 | 1-hydroxynaphthalene-3-sulfonic acid isopropylamide. |
| 73 | 29.5 | 1-hydroxynaphthalene-3-sulfonic acid-γ-methoxypropylamide. |
| 74 | 27.9 | 1-hydroxynaphthalene-3-sulfonic acid-n-butylamide. |
| 75 | 31.3 | 1-hydroxynaphthalene-3-sulfonic acid-N-methyl N-phenylamide. |

*Example 76*

A suspension of 19.7 parts of 4-aminoazobenzene in 125 parts of water and 25 parts of concentrated hydrochloric acid is diazotized within 2 hours at 12° with 6.9 parts of sodium nitrite in 120 parts of water.

The clarified diazonium salt solution is poured into a mixture of 22.5 parts of 2-hydroxynaphthalene-6-sulfonic acid-γ-methoxypropylamide and 5.98 parts of 2-hydroxynaphthalene-6-sulfonic acid methylamide in 780 parts of water and 8 parts of sodium hydroxide. The pH is maintained at 10-10.5 by the addition of sodium hydroxide to the reaction mass.

The resultant red coupling products correspond to the formulas

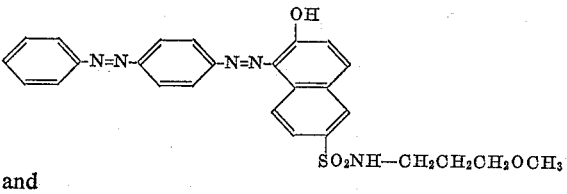

and

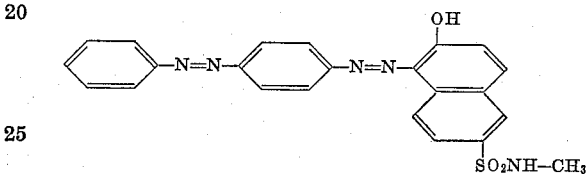

and are present in the mixture in a molar ratio of about 1:1. They are filtered off, washed with cold water and dried in vacuo at 60°. The red powder obtained is milled with a condensation product of naphthalene sulfonic acids and formaldehyde. From an aqueous suspension, preferably in the presence of o-phenylphenol, it dyes polyethylene glycol terephthalate fibers such as Tergal, in brilliant scarlet shades. The dyeings are fast to light and sublimation.

Similar dyestuffs having the same good properties are obtained by using, in addition to the 22.5 parts of 2-hydroxynaphthalene-6-sulfonic acid - γ - methoxypropylamide, the following compounds instead of the 5.98 parts of 2-hydroxynaphthalene-6-sulfonic acid methylamide:

TABLE VII

| Ex. No. | Parts | Amides |
|---|---|---|
| 77 | 5.6 | 2-hydroxynaphthalene-6-sulfonic acid amide. |
| 78 | 6.3 | 2-hydroxynaphthalene-6-sulfonic acid dimethylamide. |
| 79 | 6.7 | 2-hydroxynaphthalene-6-sulfonic acid-β-hydroxyethylamide. |
| 80 | 7.8 | 2-hydroxynaphthalene-6-sulfonic acid-di-β-hydroxyethylamide. |
| 81 | 6.65 | 2-hydroxynaphthalene-6-sulfonic acid isopropylamide. |
| 82 | 6.95 | 2-hydroxynaphthalene-6-sulfonic acid-n-butylamide. |
| 83 | 7.85 | 2-hydroxynaphthalene-6-sulfonic acid-N-methyl-N-phenylamide. |
| 83A | 7.5 | 2-hydroxynaphthalene-6-sulfonic acid-phenyl-ester. |
| 83B | 7.85 | 2-hydroxynaphthalene-6-sulfonic acid-4'-methylphenyl ester. |

*Example 84*

Example 45 is repeated, but using 45.05 parts of 1-(4'-phenylazophenylazo) - 2-hydroxynaphthalene - 6-sulfonic acid chloride as starting material in the reaction with the sodium salt of 1-hydroxybenzene, and the same procedure as in the aforesaid example is followed.

The resulting dyestuff corresponds to the formula

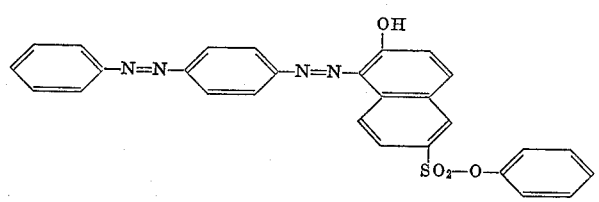

It is milled in the presence of a lignin sulfonate. When polyethylene glycol terephthalate fibers, such as Trevira, are treated in the foulard with this dyestuff and the dyeing is thermofixed, then pure scarlet dyeings are obtained which have excellent fastness to sublimation and light.

By using, in the above Example 84, instead of the 45.05 parts of 1-(4'-phenylazophenylazo) - 2-hydroxynaphthalene-6-sulfonic acid chloride, corresponding amounts of the 2-hydroxynaphthalene sulfonic acid chlorides given in the following Table VIII and condensing them under the conditions described in the above Example 45, with one of the hydroxyaryl compounds given in column 3, then dyestuffs are obtained which produce dyeings on polyester fibers having equally good properties.

is obtained. After milling with a lignin sulfonate, the dyestuff so obtained dyes polyethylene glycol terephthalate fibers such as Dacron from an aqueous dispersion, preferably in the presence of o-phenylphenol, in pure red shades. The dyeings are fast to sublimation and light.

A product having similar properties is obtained under the same conditions by using, instead of butanol, equivalent amounts of amyl alcohol or cyclohexanol.

The dyestuff sulfochloride used as starting product is produced as described in Example 43 by coupling the diazonium salt of 3,2'-dimethyl-4-aminoazobenzene with 2-hydroxynaphthalene-7-sulfonic acid and reacting the dyestuff sulfonic acid with phosphorus oxychloride in chlorobenzene in the presence of pyridine.

TABLE VIII

| No. | 2-hydroxynaphthalene sulfonic acid chloride | Hydroxyaryl compound | Shade on polyester fibers |
|---|---|---|---|
| 85 | 1-(4'-phenylazo-phenylazo)-2-hydroxynaphthalene-6-sulfonic acid chloride. | 2-methyl-1-hydroxybenzene | Scarlet. |
| 86 | do | 3-methyl-1-hydroxybenzene | Do. |
| 87 | do | 4-methyl-1-hydroxybenzene | Do. |
| 88 | do | 3-methoxy-1-hydroxybenzene | Do. |
| 89 | do | 4-tert butyl-1-hydroxybenzene | Do. |
| 90 | do | 2-chloro-1-hydroxybenzene | Do. |
| 91 | 1-(4'-phenylazo-phenylazo)-2-hydroxynaphthalene-4-sulfonic acid chloride. | Hydroxybenzene | Do. |
| 92 | do | 4-phenyl-1-hydroxybenzene | Do. |
| 93 | 1-(4'-phenylazo-phenylazo)-2-hydroxynaphthalene-5-sulfonic acid chloride. | 4-chloro-1-hydroxybenzene | Red. |
| 94 | do | 3-methoxy-1-hydroxybenzene | Do. |
| 95 | 1-(4'-phenylazo-phenylazo)-2-hydroxynaphthalene-8-sulfonic acid chloride. | Hydroxybenzene | Yellowish red. |
| 96 | do | 3-chloro-1-hydroxybenzene | Do. |
| 97 | 1-(4'-phenylazo-phenylazo)-2-hydroxynaphthalene-6-sulfonic acid chloride. | Mixture of 2- and 4-methyl-1-hydroxybenzene | Do. |
| 98 | do | Mixture of 2-methyl-1-hydroxybenzene and hydroxybenzene. | Do. |
| 99 | 1-[4'-(2''-chlorophenylazo)-phenylazo]-2-hydroxynaphthalene-6-sulfonic acid chloride. | Hydroxybenzene | Scarlet. |
| 100 | 1-[4'-(3''-chlorophenylazo)-phenylazo]-2-hydroxynaphthalene-6-sulfonic acid chloride. | 2-methyl-1-hydroxybenzene | Do. |
| 101 | 1-[4'-(4''-chlorophenylazo)-phenylazo]-2-hydroxynaphthalene-6-sulfonic acid chloride. | 4-methyl-1-hydroxybenzene | Do. |
| 102 | 1-(4'-phenylazo-2'-methyl-phenylazo)-2-hydroxynaphthalene-6-sulfonic acid chloride. | 2-chloro-1-hydroxybenzene | Do. |
| 103 | do | 4-phenyl-1-hydroxybenzene | Do. |
| 104 | do | Mixture of 2- and 4-methyl-1-hydroxybenzene | Do. |
| 105 | 1-[4'-(4''-ethoxyphenylazo)-phenylazo]-2-hydroxynaphthalene-6-sulfonic acid chloride. | 4-methyl-1-hydroxybenzene | Red. |
| 106 | 1-(4'-phenylazo-phenylazo)-2-hydroxynaphthalene-7-sulfonic acid chloride. | Hydroxybenzene | Red. |
| 107 | do | 3-methyl-1-hydroxybenzene | Do. |
| 108 | do | 4-methyl-1-hydroxybenzene | Do. |
| 109 | do | Mixture of 2- and 4-methyl-1-hydroxybenzene | Do. |
| 110 | do | 3-chloro-1-hydroxybenzene | Do. |
| 111 | do | 4-phenyl-1-hydroxybenzene | Do. |
| 111A | do | Mixture of 2-methyl-1-hydroxybenzene and hydroxybenzene (molar ratio 1:1). | Do. |
| 112 | 1-(4'-phenylazo-2'-methyl-phenylazo)-2-hydroxynaphthalene-7-sulfonic acid chloride. | 3-chloro-1-hydroxybenzene | Do. |
| 113 | 1-[4'-(4''-carboethoxy-phenylazo)-2'-methylphenylazo]-2-hydroxy-naphthalene-7-sulfonic acid cholride. | 3-acetylamino-1-hydroxybenzene | Do. |

The same dyestuffs are obtained by coupling the corresponding diazonium salt of 4-aminoazobenzene with the corresponding 2-hydroxynaphthalene-4-, -5-, -6-, -7- or -8-sulfonic acid aryl ester respectively.

*Example 114*

47.85 parts of 1-[4'-(2''-methylphenylazo)-2'-methylphenylazo] - 2-hydroxynaphthalene-7-sulfonic acid chloride and sodium n-butylate, corresponding to 0.5 part of metallic sodium, are heated in 250 parts of n-butanol for 6 hours at 75–80°. The reaction mixture is then evaporated in vacuo and the residue is taken up in 280 parts of dimethyl formamide. This dimethyl formamide solution is poured into 1500 parts of cold water, the precipitate formed is filtered off and dried. A red product of the formula

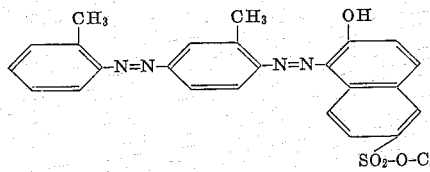

*Example 115*

A suspension of 24.1 parts of 4'-ethoxy-3-aminoazobenzene in 800 parts of water and 30 parts of 36% hydrochloric acid is diazotized at 10–15° by pouring in a solution of 6.9 parts of sodium nitrite in 50 parts of water. The clear diazonium salt solution is added dropwise at 0–5° to a solution of 23.7 parts of 2-hydroxynaphthalene-6-sulfonic acid-N-methylamide in 850 parts of water and 8 parts of sodium hydroxide. After several hours, the reaction mixture is buffered to a pH of 10–10.5 by the addition of sodium hydroxide.

The precipitated dyestuff of the formula

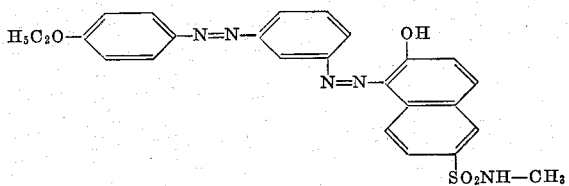

is filtered off, washed with water and dried in vacuo at 60–70°. The dyestuff is a red powder. On milling with a lignin sulfonate, the preparation so obtained dyes polyethylene glycol terephthalate fibers, e.g. Diolen, from an aqueous dispersion, preferably in the presence of a carrier such as o-phenylphenol, in pure red shades. The dyeings are fast to rubbing, sublimation and light.

By using, in the above example, instead of 23.7 parts of 2-hydroxynaphthalene-6-sulfonic acid-N-methylamide, a corresponding amount of the coupling components given in column 3 of Table III and coupling these under the conditions given in the Example 115 with the diazonium salt of 4'-ethoxy-3-aminoazobenzene, then dyestuffs ethylene glycol terephthalate fibers such as Dacron in scarlet shades from an aqueous dispersion, preferably in the presence of carriers such as o-phenylphenol. The dyebath is substantially exhausted. The dyeings have very good fastness to light and sublimation.

Dyestuff mixtures consisting of the dyestuff produced in the above Example 116 and one of those listed in the following Table IX, advantageously in a ratio of 1:1, produce dyeings having similarly good properties on polyester fibers.

TABLE IX

| No. | Diazo component | Coupling component | Shade on polyester fibers |
|---|---|---|---|
| 117 | 4-aminoazobenzene | 2-hydroxynaphthalene-6-sulfonic acid amide | Scarlet. |
| 118 | do | 2-hydroxynaphthalene-6-sulfonic methylamide | Do. |
| 119 | do | 2-hydroxynaphthalene-6-sulfonic dimethylamide | Do. |
| 120 | do | 2-hydroxynaphthalene-6-sulfonic β-hydroxyethylamide | Do. |
| 121 | do | 2-hydroxynaphthalene-6-sulfonic N-methyl-β hydroxyethylamide. | Do. |
| 122 | do | 2-hydroxynaphthalene-6-sulfonic γ-methoxy-propylamide | Do. |
| 123 | do | 2-hydroxynaphthalene-6-sulfonic N-butylamide | Do. |
| 124 | do | 2-hydroxynaphthalene-6-sulfonic N-methyl-N-phenylamide. | Do. |
| 125 | do | 2-hydroxynaphthalene-6-sulfonic phenylester | Do. |
| 126 | do | 2-hydroxynaphthalene-6-sulfonic 4'-acetylamino-phenylester. | Do. |
| 127 | 4-amino-2'-nitroazobenzene | 2-hydroxynaphthalene-6-sulfonic γ-methoxypropyl-amide | Do. | are obtained which produce dyeings on polyester fibers which have equally good properties.

*Example 116*

A suspension of 19.7 parts of 4-aminoazobenzene in

Dyestuffs having similar properties are obtained by coupling equivalent amounts of the diazo and coupling components given in the following Table X under the conditions described in Example 116:

TABLE X

| No. | Diazo component | Coupling component | Shade on polyester fibers |
|---|---|---|---|
| 128 | 4-aminoazobenzene | 2-hydroxynaphthalene-6-sulfonic acid-dimethylamide plus 2-hydroxynaphthalene-6-sulfonic acid-4'-methyl-phenylester (1:1). | Scarlet. |
| 129 | do | 2-hydroxynaphthalene-6-sulfonic acid-γ-methoxypropyl-amide plus 2-hydroxynaphthalene-6-sulfonic acid-4'-acetaminophenylester (4:5). | Do. |
| 130 | do | 2-hydroxynaphthalene-6-sulfonic acid-N-methyl-N-phenylamide plus 2-hydroxynaphthalene-6-sulfonic acid-4'-chlorophenylester (1:1). | Do. |
| 131 | 4-amino-4'-hydroxy azobenzene | 2-hydroxynaphthalene-6-sulfonic acid-N-methyl-N-β-hydroxyethylamide plus 2-hydroxynaphthalene-6-sulfonic acid-2'-methylphenylester (5:4). | Do. |
| 132 | 4-amino-2' nitroazobenzene | 2-hydroxynaphthalene-6-sulfonic acid-n-butylamide plus 2-hydroxynaphthalene-6-sulfonic phenylester (1:1). | Do. |

125 parts of water and 25 parts of concentrated hydrochloric acid is diazotized in the usual way for 2 hours at 12° with 6.9 parts of sodium nitrite.

The clarified diazonium salt solution is poured into a solution of 28.1 parts of 2-hydroxynaphthalene-6-sulfonic acid-N-methyl-N-hydroxyethylamide in 600 parts of water and 8 parts of sodium hydroxide. Sodium hydroxide is added to the reaction mass while cooling until the pH thereof is 10–10.5. On completion of the coupling, the red dyestuff is filtered off under suction, washed with water and dried at 60°. The coupling product is suspended in 150 parts of glacial acetic acid and the suspension is acetylated for 2 hours at 100–110° with acetic acid anhydride. The acetylated product is filtered off and washed with water. It is a red powder the composition of which corresponds to the formula

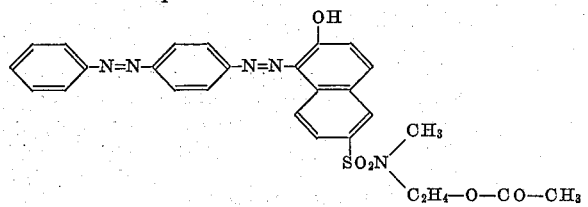

When milled with an alkali metal salt of dodecylbenzene sulfonate, the dyestuff so obtained dyes poly-

*Example 133*

A suspension of 19.7 parts of 4-aminoazobenzene in 125 parts of water and 25 parts of concentrated hydrochloric acid is diazotised at 12° in the usual way for 2 hours with 6.9 parts of sodium nitrite in 120 parts of water.

The clarified diazonium salt solution is added dropwise to a solution of 35.8 parts of 1-carboxy-2-hydroxynaphthalene-6-sulfonic acid-(2'-methylphenyl)-ester in 850 parts of water and 8 parts of sodium hydroxide. Whilst cooling, sodium hydroxide is added to the reaction mass until the pH is 10–10.5.

The precipitated dyestuff of the formula

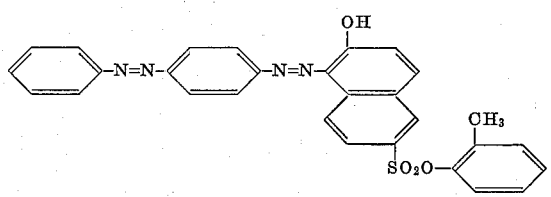

is filtered off, washed, dried in vacuo at 65° and milled with dodecylbenzene sulfonate.

It is a red powder which dyes polyester fibers such as Dacron in red shades from an aqueous dispersion, preferably in the presence of o-phenylphenol. The dyeings have very good fastness to washing, sublimation and light.

The 1-carboxy-2-hydroxynaphtalene-6-sulfonic acid-(2'-methylphenyl-ester used for the coupling is obtained, for example, be reacting 1-carboxy-2-benzyloxy-naphtalene-6-sulfonic acid with phosphorus oxychloride to form the corresponding sulfonic acid chloride, condensing this with 2-methyl-1-hydroxybenzene and saponifying the benzyl radical.

By using in the above example, instead of the 35.8 parts of 1-carboxy-2-hydroxynaphthalene-6-sulfonic acid-(2'-methylphenyl)-ester, a corresponding amount of the coupling components given in the following Table XI and coupling these under the conditions described in the Example 134 with the diazonium salt of 4-aminoazobenzene then dyestuffs are obtained which produce dyeings on polyester fibers which have equally good properties.

TABLE XI

| No. | Parts | Ester |
|---|---|---|
| 134 | 34.4 | 1-carboxy-2-hydroxynaphthalene-5-sulfonic acid phenylester. |
| 135 | 37.85 | 1-carboxy-2-hydroxynaphthalene-6-sulfonic acid (4'-chlorophenyl)-ester. |
| 136 | 35.8 | 1-carboxy-2-hydroxynaphthalene-5-sulfonic acid-(4'-methylphenyl)-ester. |
| 137 | 42.0 | 1-carboxy-2-hydroxynaphthalene-6-sulfonic acid-(4'-phenylphenyl)-ester. |
| 138 | Mixture of 17.9 | 1-carboxy-2-hydroxynaphthalene-6-sulfonic acid-(2'methylphenyl)-ester and |
|  | 17.2 | 1-carboxy-2-hydroxynaphthalene-6-sulfonic acid phenyl-ester. |

Example 139

A suspension of 19.7 parts of 4-aminoazobenzene in 125 parts of water and 25 parts of concentrated hydrochloric acid is diazotised at 12° within 3 hours with 6.9 parts of sodium nitrite in 100 parts of water.

The clarified diazonium salt solution is added dropwise to a solution of 30.1 parts of 2-hydroxynaphthalene-6-sulfonic acid-3'-pyridyl ester in 1000 parts of water and 8 parts of sodium hydroxide. While cooling, sodium hydroxide is added to the reaction mass until its pH is 10–10.5.

The precipitated red dyestuff of the formula

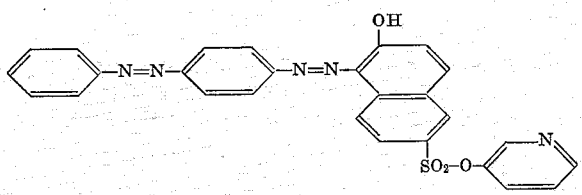

is filtered off, washed with cold water, dried in vacuo at 70° and milled with the sodium salt of dinaphthyl methane sulfonic acid.

It is a red powder which dyes polyester fibers such as Dacron in red shades from aqueous dispersion, preferably in the presence of o-phenylphenol. The dyeings have very good fastness to washing, sublimation and light.

By using in the above example, instead of the 19.7 parts of 4-aminoazobenzene, a corresponding amount of 4-amino-2'-chloroazobenzene, 4-amino-2',4'-dichloroazobenzene, 4-amino-3'-chloroazobenzene, 4-amino-4'-methoxyazobenzene or 4-amino-2-methylazobenzene and performing coupling under the conditons described in the above Example 139, dyestuffs are obtained which produce dyeings on polyester fibers having equally good properties.

The 2-hydroxynaphthalene-6-sulfonic acid - 3' - pyridyl ester used for the coupling is obtained, for example, by reacting 1-carboxy-2-hydroxynaphthalene-6-sulfonic acid chloride with 3-hydroxypyridine in aqueous medium at a pH of 9.5–10 and then decarboxylating at a pH of 2.

Example 140

45.05 parts of 2-(4'-phenylazophenylazo)-1-hydroxynaphthalene-4-sulfonic acid chloride and 9.5 parts of 3-hydroxy-pyridine in 500 parts of water and 300 parts of ethyl alcohol are heated for 15 hours at 90–95°, while stirring, in the presence of 65 parts of sodium carbonate. After cooling the reaction mixture to room temperature, the precipitated red dyestuff is filtered off, washed with a lot of cold water and dried in vacuo at 70°. The dyestuff corresponds to the formula

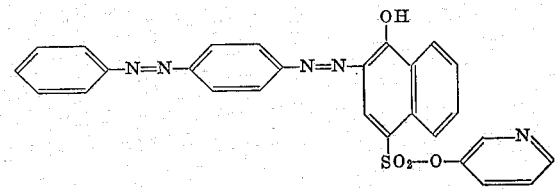

It is milled in the presence of an alkali-lignin sulfonate. By treating polyethylene glycol terephthalate fibers such as Trevira with this dyestuff on the foulard and thermofixing the dyeing, it dyes these fibers in pure red shades. The dyeings have excellent fastness to sublimation and light.

By using in the above Example 140, instead of the 45.05 parts of 2-(4'-phenylazophenylazo)-1-hydroxynaphthalene-4-sulfonic acid chloride, a corresponding amount of 2-(4''-chloro-4'-phenylazophenylazo)-1-hydroxynaphthalene-4-sulfonic acid chloride, 2-(2'',4''-dichloro - 4' - phenylazophenylazo) - 1 - hydroxynaphthalene-4-sulfonic acid chloride, 2-(4''-methoxy-4'-phenylazophenylazo) - 1 - hydroxynaphthalene - 4 - sulfonic acid chloride, 2 - (4' - phenylazo - 3' - methylphenylazo) - 1-hydroxynaphthalene-4-sulfonic acid chloride and then condensing them under the conditions given in the above example with 3-hydroxypyridine, then dyestuffs are obtained which produce dyeings on polyester fibers having equally good properties.

The 2-(4'-phenylazophenylazo)-1-hydroxynaphthalene-4-sulfonic acid chloride used in the above example as starting materials is obtained by coupling diazotised 4-amino-1, 1'-azobenzene with 1-hydroxynaphthalene-4-sulfonic acid and reacting the dyestuff sulfonic acid with phosphorus oxychloride in chlorobenzene.

Example 141

3 parts of the dyestuff of the formula given in Example 43 are dispersed in 4000 parts of water. 12 parts of the sodium salt of o-phenylphenol and 12 parts of diammonium phosphate are added to this dispersion and 100 parts of fabric made from polyterephthalic acid ethyleneglycol ester are dyed for one and a half hours at 90–95°. The dyeing is rinsed and thoroughly washed with dilute sodium hydroxide solution and a dispersing agent.

In this way a scarlet dyeing is obtained which is fast to light, washing and sublimation.

The other dyestuffs described produce similarly good dyeings.

Example 142

2 parts of the dyestuff of the formula given in Example 84 are finely suspended in 4000 parts of water which contains 2 parts of the condensation product of 1 equivalent of the coconut oil fatty alcohol and 25 equivalents of ethylene oxide. The pH of the dyebath is adjusted with acetic acid to 6.5.

100 parts of terephthalic acid polyethyleneglycol ester fabric are introduced at 40°, the bath is heated within 15 minutes in the autoclave to 120° and is kept for 45 minutes at this temperature. The dyeing is rinsed with water and soaped. In this way a scarlet dyeing which is fast to light and sublimation is obtained.

The other dyestuffs described produce similarly good dyeings.

Example 143

Polyethyleneglycol terephthalate fabric such as Dacron is impregnated on the foulard at 40° with a liquor of the following composition:

20 parts of the dyestuff of the formula given in Example 1 finely dispersed in:
7.5 parts of sodium alginate,
20 parts of triethanolamine,
20 parts of the condensation product of one mole of oleyl alcohol with 20 moles of ethylene oxide, and
900 parts of water.

The fabric is squeezed out to 100% liquor content, is dried at 100° and the dyeing is then fixed for 30 seconds at a temperature of 210°. The dyed goods are rinsed with water, soaped and dried. Under these conditions, a scarlet dyeing is obtained which is fast to washing, rubbing, light and sublimation.

The dyestuffs described in the other examples produce dyeings of equal quality by this process.

Example 144

Example 141 is repeated but using the dyestuff of Example 44 instead of that of Example 43.

In this way, a brilliant red dyeing is obtained which is fast to light, washing and sublimation.

Example 145

Example 142 is repeated by using the dyestuff of Example 45, all other materials and conditions remaining unchanged. In this way a red dyeing is obtained which is fast to light and sublimation.

Example 146

Example 143 is repeated but using the dyestuff of Example 11, all other materials and conditions remaining the same. A red dyeing is obtained which is fast to washing, rubbing, light and sublimation.

Example 147

A suspension of 19.7 parts of 4-amino-azobenzene in 1.25 parts of water and 25 parts of concentrated hydrochloric acid is diazotized in the conventional manner for 2 hours at 12° with 6.9 parts of sodium nitrite.

The clarified diazonium salt solution is poured into a solution of 32.0 parts of 2-hydroxy naphthalene-6-sulfonic acid-N-β-cyanoethyl-N-β-hydroxyethyl amide in 800 parts of water and 8 parts of sodium hydroxide.

The resulting red dyestuff is filtered off under suction, washed with water and dried at 60°. It is a red powder, the composition of which corresponds to the formula

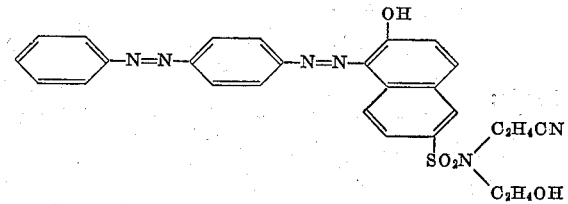

When milled with an alkali metal salt of dodecylbenzene sulfonate, the dyestuff so obtained dyes polyethylene glycol terephthalate fibers such as Dacron in scarlet shades from an aqueous dispersion, preferably in the presence of carriers such as o-phenylphenol. The dyebath is substantially exhausted. The dyeings have very good fastness to light and sublimation.

By using, in the above Example 147, instead of the 13.7 parts of 4-aminoazobenzene, an equivalent amount of the diazo components given in column 2 of the following Table XII, and coupling the same under the conditions given in the above example with the coupling components given in column 3, dyestuffs are obtained which produce dyeings on polyester fibers having equally good properties.

TABLE XII

| No. | Diazo component | Coupling component | Shade on polyester fibers |
|---|---|---|---|
| 148 | 4-amino-2'-bromo-4'-nitro-azobenzene. | 2-hydroxynaphthalene-6-sulfonic acid-N-β-cyanoethyl-amide. | Blueish-red. |
| 149 | do | 2-hydroxynaphthalene-6-sulfonic acid-N-benzyl-N-β-hydroxyethyl-amide. | Do. |
| 150 | do | 2-hydroxynaphthalene-7-sulfonic acid-N-benzyl-amide. | Do. |
| 151 | 4-amino-2'-nitro-4'-methylsulfonyl-azobenzene. | 1-hydroxynaphthalene-3-sulfonic acid-N-4'-chlorophenyl-amide. | Do. |
| 152 | do | 2-hydroxynaphthalene-5-sulfonic acid-N-4'-bromophenyl-amide. | Do. |
| 153 | do | 1-hydroxynaphthalene-4-sulfonic acid-benzyl-ester. | Red. |
| 154 | do | 2-hydroxynaphthalene-6-sulfonic acid-4'-methylbenzyl-ester. | Red. |
| 155 | do | 2-hydroxynaphthalene-6-sulfonic acid-4'-chlorobenzyl-ester. | Red. |
| 156 | do | 2-hydroxynaphthalene-6-sulfonic acid-4'-bromobenzyl-ester. | Red. |
| 157 | do | 2-hydroxynaphthalene-6-sulfonic acid-3'-(β-hydroxyethoxy)-phenyl-ester. | Red. |
| 158 | do | 2-hydroxynaphthalene-6-sulfonic acid-p-diphenyl-ester. | Red. |
| 159 | do | 2-hydroxynaphthalene-6-sulfonic acid-2'-methoxy-carbonyl-phenyl-ester. | Red. |
| 160 | do | 2-hydroxynaphthalene-6-sulfonic acid-2'-carbamyl-phenyl-ester. | Red. |
| 161 | 4'-nitro-2-bromo-4-amino-azobenzene. | do | Red. |
| 162 | do | 2-hydroxynaphthalene-6-sulfonic acid-2'-N-ethylcarbamyl-phenyl-ester. | Red. |
| 163 | do | 2-hydroxynaphthalene-7-sulfonic acid-2'-N-dimethylcarbamyl-phenyl-ester. | Red. |
| 164 | do | 2-hydroxynaphthalene-6-sulfonic acid-2'-(N-β-hydroxyethyl carbamyl)-phenyl-ester. | Red. |
| 165 | do | 2-hydroxynaphthalene-6-sulfonic acid-2'-N-γ-methoxypropyl-carbamyl-phenyl-ester. | Red. |
| 166 | do | 2-hydroxynaphthalene-6-sulfonic acid-2'-sulfamyl-phenyl-ester. | Red. |
| 167 | 4'-nitro-2-fluoro-4-amino-azobenzene. | 1-hydroxynaphthalene-5-sulfonic acid-2'-N,N-dimethyl-sulfonamyl-phenyl-ester. | Red. |
| 168 | do | 2-hydroxynaphthalene-6-sulfonic acid-2'-N-β-hydroxyethylsulfamyl-phenyl-ester. | Red. |
| 169 | do | 2-hydroxynaphthalene-6-sulfonic acid-2'-N-γ-methoxypropyl-sulfamyl-phenyl-ester. | Red. |
| 170 | 4'-phenoxy-4-amino-azobenzene. | 2-hydroxynaphthalene-6-sulfonic acid-4'-N-β-acetylhydroxyethyl-sulfamyl-phenyl-ester. | Red. |
| 171 | do | 2-hydroxynaphthalene-6-sulfonic acid-3'-N,N-dimethylamino-phenyl-ester. | Red. |
| 172 | do | 2-hydroxynaphthalene-6-sulfonic acid-4'-bromophenyl-ester. | Red. |

We claim:
1. A dyestuff selected from the group consisting of a compound of the formula

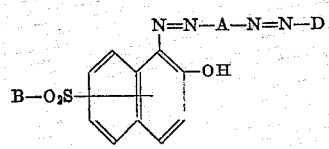

(I)

and a compound of the formula

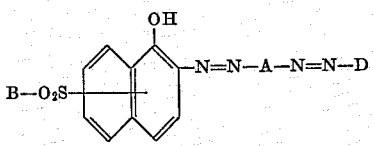

(II)

wherein:
A is a member selected from the group consisting of phenylene, fluoro-phenylene, lower alkoxy-phenylene, chloro-phenylene and bromo-phenylene;
D is a member selected from the group consisting of phenyl, alkyl-phenyl wherein alkyl has from 1 to maximally 5 carbon atoms, hydroxy-phenyl, lower alkoxy-phenyl, phenoxy-phenyl, nitro-phenyl, lower alkoxycarbonyl-phenyl, hydroxy-lower alkoxy-phenyl, bromo-phenyl, chlorophenyl and lower alkyl-sulfonyl-phenyl;
B is a member selected from the group consisting of $-NH_2$;
an amino group monosubstituted with one substituent or disubstituted with two identical or different substituents selected from the class consisting of alkyl with from 1 to 10 carbon atoms, hydroxy-lower alkyl, lower alkoxy-lower alkyl, lower alkanoyl-oxy-lower alkyl and cyano-lower alkyl;
a substituted amino group in which one of the free amino nitrogen bonds is occupied by one of the following: hydrogen, alkyl with from 1 to 10 carbon atoms and hydroxy-lower alkyl, and another free bond is occupied by one of the substituents: cycloalkyl with 6 ring carbon atoms, benzyl, phenyl, chlorophenyl and bromophenyl;
morpholino;
alkoxy with from 4 to 8 carbon atoms;
phenyl-lower alkoxy, lower alkyl-phenyl-lower alkoxy, chloro - phenyl - lower alkoxy, bromo - phenyl-lower alkoxy;
cycloalkoxy with 6 ring carbon atoms;
phenoxy, lower alkyl-phenoxy, lower alkoxy-phenoxy, phenyl-phenoxy, lower alkoxy-carbonyl-phenoxy, carbamyl-phenoxy, sulfamyl-phenoxy; carbamyl-phenoxy N-substituted with from one to two of the substituents: lower alkyl, hydroxy-lower alkyl and lower alkoxy-lower alkyl; sulfamyl-phenoxy N-substituted with from one to two of the substituents: lower alkyl, hydroxy-lower alkyl and lower alkoxy-lower alkyl; N,N-di-lower alkyl-amino-phenoxy, lower alkanoyl - amino - phenoxy, chloro - phenoxy, bromo-phenoxy; and
pyridyl-3-oxy;
said dyestuff being free from water-solubilizing groups which dissociate acid in water.
2. A dyestuff of the formula

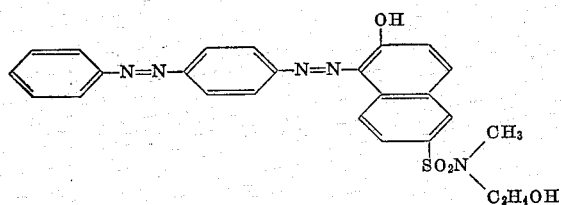

3. A dyestuff of the formula

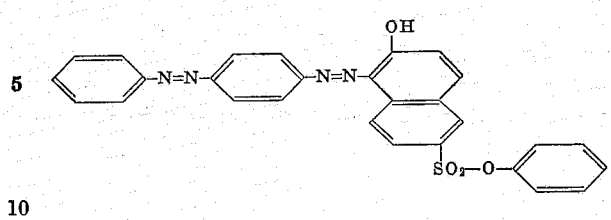

4. A dyestuff of the formula

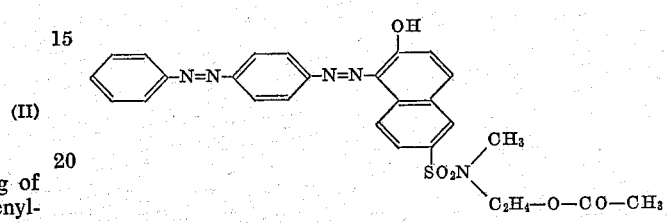

5. A dyestuff of the formula

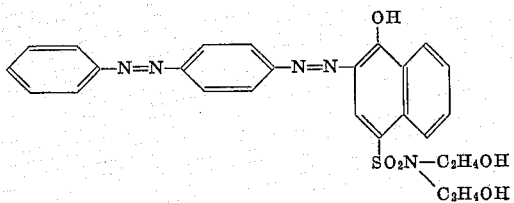

6. A dyestuff of the formula

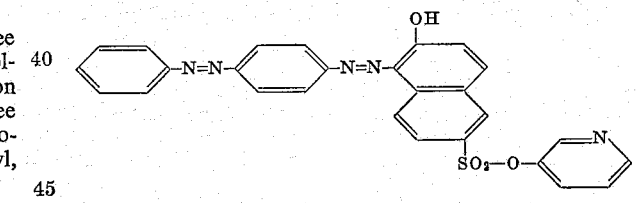

7. A dyestuff of the formula

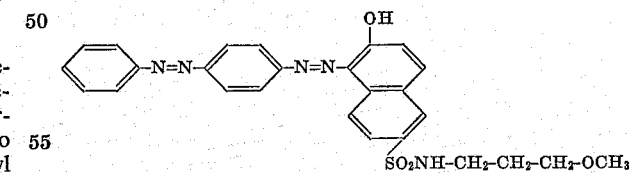

8. A dyestuff mixture consisting essentially of
(a) a dyestuff as defined in claim 1, wherein B is a sulfonamide radical as defined in claim 1, and
(b) a dyestuff as defined in claim 1, wherein B is an aryloxy radical as defined in claim 1, the proportions of (a) to (b) being within the range of 4:1 to 1:4.
9. A dyestuff mixture consisting essentially of a compound of the formula

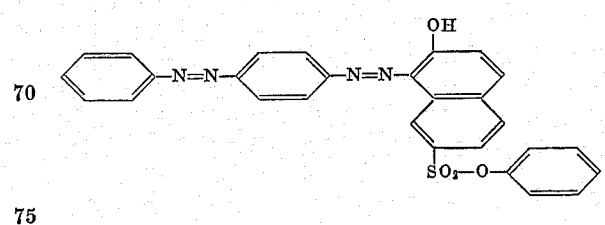

and a compound of the formula
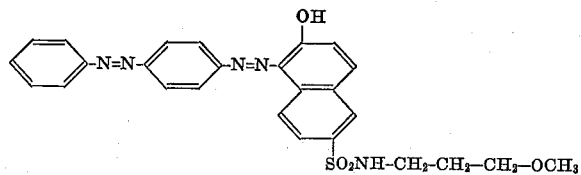
mixed in a molar ratio of about 1:1.
References Cited
UNITED STATES PATENTS
3,213,077  10/1965  Maderni et al. _____ 260—191
CHARLES B. PARKER, *Primary Examiner.*
JOSEPH P. BRUST, *Examiner.*
D. M. PAPUGA, *Assistant Examiner.*